US012705843B2

(12) United States Patent
Fu et al.

(10) Patent No.: US 12,705,843 B2
(45) Date of Patent: Aug. 11, 2026

(54) MICROLENS DISPLAY APPARATUS FOR USE IN AN AUGMENTED REALITY SYSTEM

(71) Applicant: Applied Materials, Inc., Santa Clara, CA (US)

(72) Inventors: Jinxin Fu, Fremont, CA (US); Sihui He, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 175 days.

(21) Appl. No.: 18/812,051

(22) Filed: Aug. 22, 2024

(65) Prior Publication Data

US 2025/0078424 A1 Mar. 6, 2025

Related U.S. Application Data

(60) Provisional application No. 63/535,129, filed on Aug. 29, 2023.

(51) Int. Cl.
*G06T 19/00* (2011.01)
*G02B 6/10* (2006.01)

(52) U.S. Cl.
CPC .............. *G06T 19/006* (2013.01); *G02B 6/10* (2013.01)

(58) Field of Classification Search
None
See application file for complete search history.

(56) References Cited

U.S. PATENT DOCUMENTS

| | | | |
|---|---|---|---|
| 2018/0343443 A1 | 11/2018 | Perreault et al. | |
| 2018/0374266 A1* | 12/2018 | Schowengerdt ... | G02B 27/0972 |
| 2022/0279158 A1 | 9/2022 | Hong et al. | |
| 2022/0360764 A1 | 11/2022 | Hong | |
| 2022/0404618 A1 | 12/2022 | Klug et al. | |
| 2023/0266596 A1 | 8/2023 | Schuck et al. | |

OTHER PUBLICATIONS

International Search Report and Written Opinion dated Nov. 29, 2024, re: PCT Application No. PCT/US2024/043386.

* cited by examiner

*Primary Examiner* — Peter Hoang
(74) *Attorney, Agent, or Firm* — Patterson + Sheridan, LLP

(57) ABSTRACT

Embodiments of the present disclosure generally relate to augmented reality (AR) systems. More specifically, embodiments described herein provide for an AR projection system and AR devices having the projection system. In one or more embodiments, an augmented reality device includes a projection system. The projection system includes a light engine. The light engine includes a pixel. The pixel includes an emission surface. A microlens is coupled to the emission surface of the pixel. The projection system further includes a projection lens configured to refract a first light emitted by the pixel. The first light has a first pupil length defined by a distance between a first end and a second end of the first light. The augmented reality device further includes a waveguide including an input coupler configured to incouple the first light at a first bounce length that is equivalent to the first pupil length.

20 Claims, 6 Drawing Sheets

MICROLENS DISPLAY APPARATUS FOR USE IN AN AUGMENTED REALITY SYSTEM

CROSS-REFERENCE TO RELATED APPLICATIONS

This application claims benefit of U.S. provisional patent application Ser. No. 63/535,129, filed Aug. 29, 2023, which is herein incorporated by reference.

BACKGROUND

Field

Embodiments of the present disclosure generally relate to augmented reality (AR) systems. More specifically, embodiments described herein provide for an AR projection system and AR devices having the projection system.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Typical augmented reality systems include a microdisplay. The microdisplay projects a light image into an incoupler of a waveguide. The waveguide reflects the light to an outcoupler where the waveguide outcouples the light image through an outcoupler. The reflection within the waveguide results in nonuniform bounce lengths of the light image. The non-uniform bounce lengths result in a decreased quality of the light image after it is outcoupled.

Accordingly, what is needed in the art are is an AR projection system which maintains a uniform bounce length within the waveguide.

SUMMARY

Embodiments of the present disclosure generally relate to augmented reality (AR) systems. More specifically, embodiments described herein provide for an AR projection system and AR devices having the projection system.

In one or more embodiments, an augmented reality device includes a projection system. The projection system includes a light engine. The light engine includes a pixel. The pixel includes an emission surface. A microlens is coupled to the emission surface of the pixel. The projection system further includes a projection lens configured to refract a first light emitted by the pixel. The first light has a first pupil length defined by a distance between a first end and a second end of the first light. The augmented reality device further includes a waveguide including an input coupler configured to incouple the first light at a first bounce length that is equivalent to the first pupil length.

In one or more embodiments, an augmented reality device includes a projection system. The projection system includes a light engine including a plurality of pixels. The plurality of pixels include a first pixel configured to emit a first light at a first spectrum and a second pixel configured to emit a second light at a second spectrum. The light engine further includes a plurality of microlenses including a first microlens coupled to a first emission surface of the first pixel and a second microlens coupled to a second emission surface of the second pixel. The light engine further includes a projection lens configured to refract the first light and the second light. The first light has a first pupil length and the second light has a second pupil length. The augmented reality device further includes a waveguide including an input coupler configured to incouple the first light and the second light. The first light is incoupled at a first bounce length equivalent to the first pupil length and the second light is incoupled at a second bounce length equivalent to the second pupil length.

In one or more embodiments, a method of projecting a light includes emitting a light from a pixel into a microlens and refracting the light from the microlens into a projection lens. The light has a first cone angle. The method further includes refracting the light from the projection lens into an input coupler of a waveguide. The light has a pupil length. The pupil length is defined by a distance between a first end of the light and a second end of the light. The second end of the light is emitted at an inner edge of the input coupler. The method further includes reflecting the light within the waveguide towards an output coupler of the waveguide, wherein the light has a bounce length. The bounce length and the pupil length are equivalent.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to augmented reality (AR) systems. More specifically, embodiments described herein provide for an AR projection system and AR devices having the projection system.

Figure 1:
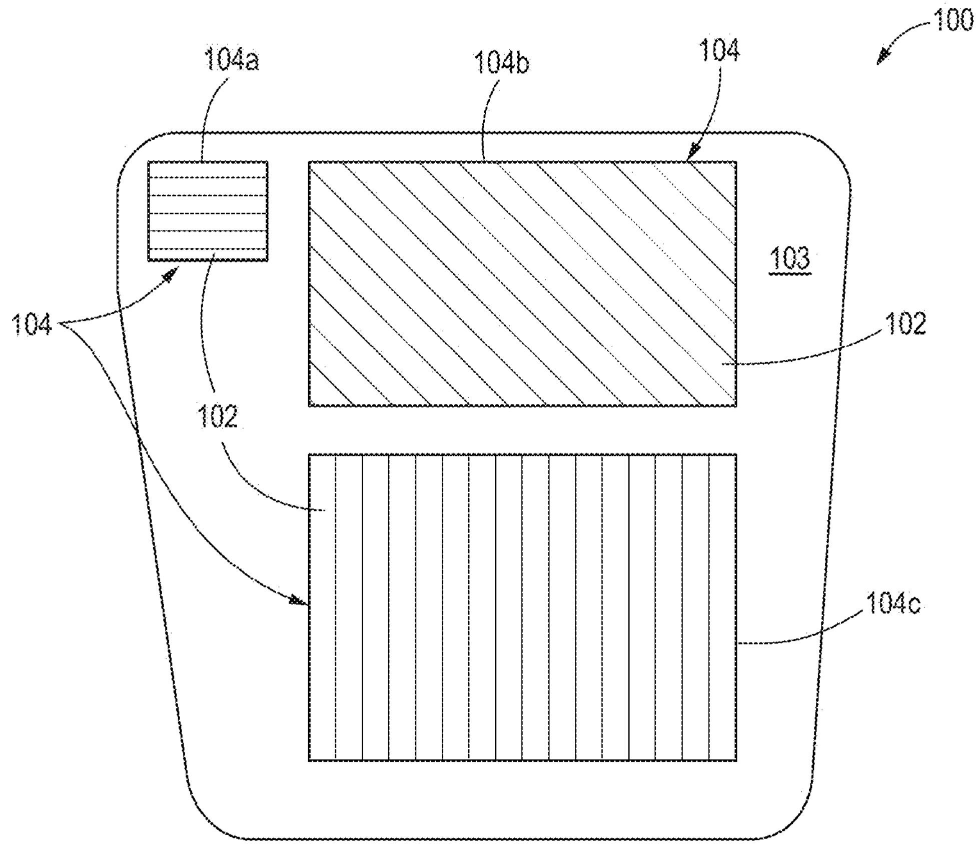
FIG. 1 is a perspective, frontal view of a waveguide, according to one or more embodiments.

FIG. 1 is a perspective, frontal view of a waveguide 100, according to one or more embodiments. It is to be understood that the waveguide 100 described herein is an exemplary waveguide and that other waveguides may be used with or modified to accomplish aspects of the present disclosure. The waveguide 100 includes a plurality of structures 102. The structures 102 may be disposed over, under, or on a first surface 103 of a substrate 101, or disposed in the substrate 101. The structures 102 are nanostructures have a sub-micron critical dimension, e.g., a width less than 1 micrometer. Regions of the structures 102 correspond to one or more gratings 104. Any of the grating 104 may be disposed over, under, or on the first surface 103 or over, under, or on a second surface 105 opposing the first surface 103. In one embodiment, which can be combined with other embodiments described herein, the waveguide 100 includes at least a input coupler 104*a* corresponding to an input coupling grating ("input coupler") and a output coupler 104*c* corresponding to an output coupling grating ("output coupler"). In another embodiment, which can be combined with other embodiments described herein, the waveguide 100 further includes a pupil expander 104*b*. The pupil expander 104*b* corresponds to a pupil expansion grating ("Pupil Expander") or a fold grating.

Figure 2:
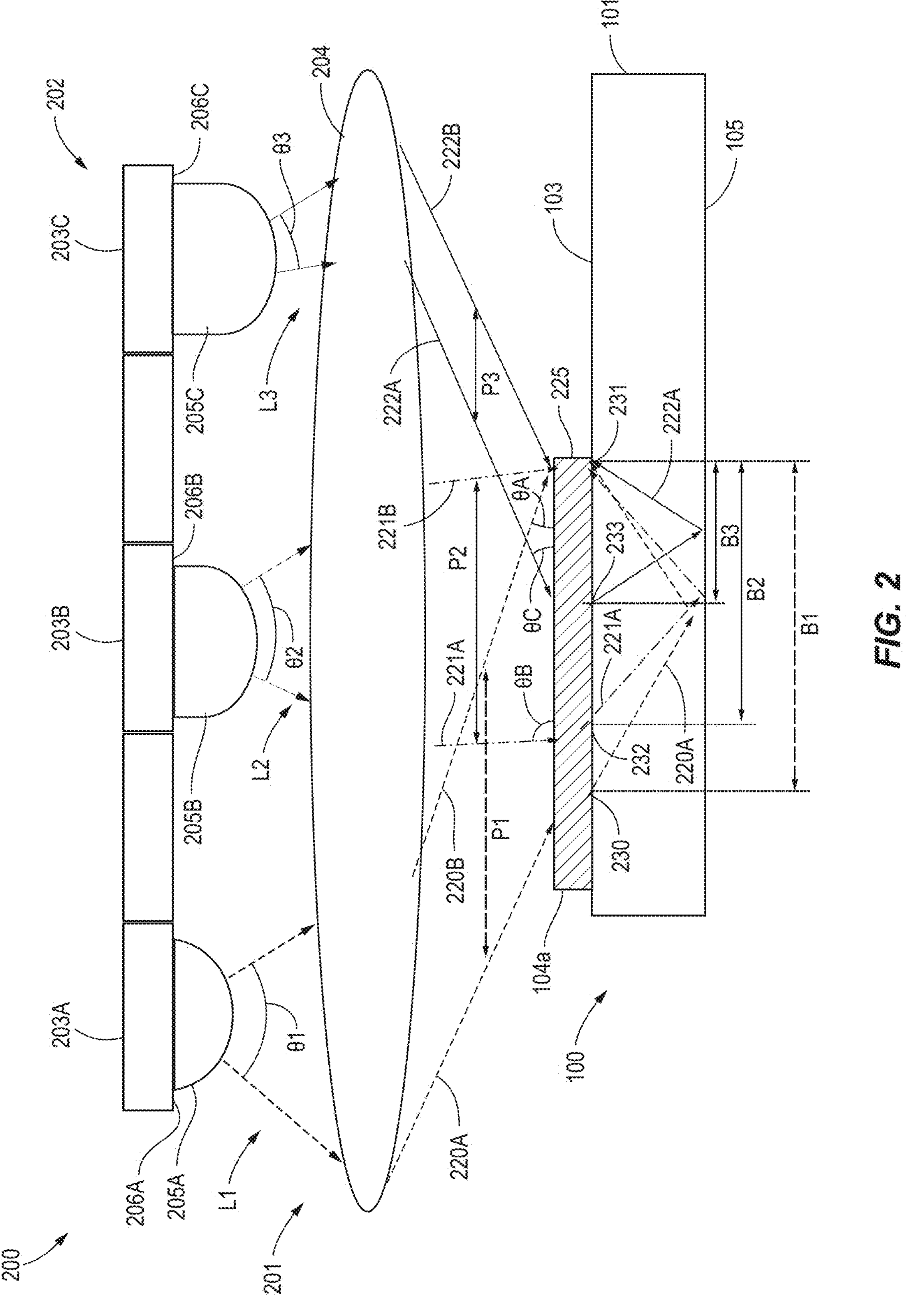
FIG. 2 is a schematic cross-sectional view of an augmented reality device with the projection system and an input coupler of a waveguide, according to one or more embodiments.

FIG. 2 is a schematic cross-sectional view of an augmented reality device 200, according to one or more embodiments. The augmented reality device 200 includes a projection system 201. The projection system includes a light engine 202, a projection lens 204, and a plurality of microlenses 205A, 205B, 205C. The light engine 202 includes at least a first pixel 203A, a second pixel 203B, and a third pixel 203C. In one or more embodiments, the first pixel 203A, second pixel 203B, and third pixel 203C each include individual sub-pixels. In one or more embodiments, the first pixel 203A, second pixel 203B, and third pixel 203C are sub-pixels which together form a single pixel. In one or more embodiments, the first pixel 203A is configured to emit a first light L1 from a first emission surface 206A, the second pixel 203B is configured to emit a second light L2 from a second emission surface 206B, and the third pixel 203C is configured to emit a third light L3 from a third emission surface 206C. In one or more embodiments, the first light L1, the second light L2, and the third light L3 are light cones when they are emitted from the first pixel 203A, second pixel 203B, and third pixel 203C respectively. The first light L1 has a first spectrum. In one or more embodiments, the first spectrum corresponds to a red light. The second light L2 has a second spectrum. In one or more embodiments, the second spectrum corresponds to a green light. The third light L3 has a third spectrum. In one or more embodiments, the third spectrum corresponds to a blue light. It should be understood that the light engine 202 can include any number of pixels. Each pixel 203A, 203B, 203C can be configured to emit a light beam at any desired spectrum. For example, each pixel 203A, 203B, 203C can be configured to emit a blue light having the same wavelength as one another. In one or more embodiments each pixel 203A, 203B, 203C emits a light having a different wavelength from one another.

Each pixel 203A, 203B, 203C includes a microlens disposed over the pixel. The microlens is an optical lens with a diameter less than 1 millimetre (mm) which helps tune the light emitted by each individual pixel 203A, 203B, 203C. The first pixel 203A includes a first microlens 205A, the second pixel 203B includes a second microlens 205B, and the third pixel 203C includes a third microlens 205C. The first microlens 205A causes the first light L1 to be emitted at a first cone angle θ1. The second microlens 205B causes the second light L2 to be emitted at a second cone angle θ2. The third microlens 205C causes the third light L3 to be emitted at a third cone angle θ3.

The first light L1, the second light L2, and the third light L3 are directed into the projector lens 204 by the first microlens 205A, the second microlens 205B, and the third microlens 205C respectively. In one or more embodiments, the first light L1, the second light L2, and the third light L3 are light beams after they are refracted by the projector lens. After the first light L1 exits the projector lens 204 it is directed into the input coupler 104*a* of the waveguide 100. The first light L1 is refracted in the projector lens 204 so that it has a first pupil length P1. The first pupil length P1 is defined by the distance between a first end 220A of the first light L1 and a second end 220B of the first light L1 opposite to the first end. The second end 220B of the first light L1 is the end of the light beam that contacts an inner edge 225 of the input coupler 104*a*. The first pupil length P1 can be adjusted by adjusting the first cone angle θ1 that the first light L1 is emitted at. The first cone angle θ1 can be set by tuning the first microlens 205A. The first light L1 travels from the projector lens 204 to the input coupler 104*a*. The input coupler 104*a* is aligned with the first light L1 so that the second end 220B is aligned with an inner edge 225 of the input coupler 104*a*.

After the second light L2 exits the projector lens 204 it is directed into the input coupler 104*a*. The second light L2 is refracted in the projector lens 204 so that it has a second pupil length P2. The second pupil length P2 is defined by the distance between a first end 221A of the second light L2 and a second end 221B of the second light L2. The second pupil length P2 can be adjusted by adjusting the second cone angle θ2 that the second light L2 is emitted at. The second cone angle θ2 can be controlled tuning the second microlens 205B. The second light L2 travels from the projector lens 204 to the input coupler 104*a*. The input coupler 104*a* is aligned with the second light L2 so that the second end 221B is aligned with an inner edge 225 of the input coupler 104*a*.

The third light L3 is refracted in the projector lens 204 so that it has a third pupil length P3. The third pupil length P3 is defined by the distance between a first end 222A of the third light L3 and a second end 222B of the third light L3. The pupil length L3 can be adjusted by adjusting the third cone angle θ3 that the third light L3 is emitted at. The third cone angle θ3 can be controlled tuning the third microlens 205C. The third light L3 travels from the projector lens 204 to the input coupler 104*a*. The input coupler 104*a* is aligned with the third light L3 so that the second end 222B is aligned with an inner edge 225 of the input coupler 104*a*.

The first light L1, the second light L3, and the third light L3 are directed into input coupler 104*a* by the projector lens 204. After the first light L1 enters the input coupler 104*a*, the first light L1 is refracted into the substrate 101. The first light L1 is reflected within the substrate 101 at a first bounce length B1. The first bounce length B1 is defined by the distance between a first point 230 the first end 220A of the first light L1 entering the substrate 101 at the first surface 103 and a second point 231 where the first end 220A contacts the first surface 103 after completing one bounce against the second surface 105. The second end 220B of the first light L1 enters the substrate at the second point 231. The first bounce length B1 is determined by the first spectrum of the first light L1 and the first input angle θA that the first light L1 enters input coupler 104*a* at. The first bounce length B1 is substantially equivalent to the first pupil length P1. Therefore, after the first end 220A has completed one bounce against the second surface 105, the first end 220A and the second end 220B of the first light L1 overlap while within the substrate 101.

After the second light L2 enters the input coupler 104*a*, the second light L2 is refracted into the substrate 101. The second light L2 is reflected within the substrate 101 at a second bounce length B2. The second bounce length B2 is defined by the distance between a first point 232 the first end 221A of the second light L2 entering the substrate 101 at the first surface 103 and the second point 231 where the first end 221A contacts the first surface 103 after completing one bounce against the second surface 105. The second end 221B of the second light L2 enters the substrate 101 at the second point 231. The second bounce length B2 is determined by the second spectrum of the second light L2 and the second input angle θB that the second light L2 enters input coupler 104*a* at. The second bounce length B2 is equivalent to the second pupil length P2. Therefore, after the first end 221A has completed one bounce against the second surface 105, the first end 221A and the second end 221B of the second light L2 overlap while within the substrate 101.

After the third light L3 enters the input coupler 104*a*, the third light L3 is refracted into the substrate 101. The third light L3 is reflected within the substrate 101 at a third bounce length B3. The third bounce length B3 is defined by the distance between a first point 233 the first end 222A of the third light L3 entering the substrate 101 at the first surface 103 and the second point 231 where the first end 222A contacts the first surface 103 after completing one bounce against the second surface 105. The second end 222B of the third light L3 enters the substrate at the second point 231. The third bounce length B3 is determined by the third spectrum of the third light L3 and the third input angle θC that the third light L3 enters input coupler 104*a* at. The third bounce length B3 is equivalent to the third pupil length P3. Therefore, after the first end 222A has completed one bounce against the second surface 105, the first end 222A and the second end 222B of the third light L3 overlap while within the substrate 101.

The second point 231 is aligned with the inner edge 225 of the input coupler 104*a*. The inner edge 225 being aligned with the second point 231 ensures that the light beams L1, L2, L3 are not reflected back into the input coupler 104*a*. If the light beams L1, L2, L3 are reflected back into the input coupler 104*a* then some of the light from the light beams L1, L2, L3 are reflected out of the waveguide 100 which decreases the efficiency of the augmented reality device 200. Additionally, if the light beams L1, L2, L3 are reflected back into the input coupler 104*a* then some of the light is refracted back into the substrate 101. The light refracted back into the substrate 101 is offset from the light beams L1, L2, L3 and creates a ghost image for the user. The pupil lengths P1, P2, P3 are adjusted to ensure that the pupil lengths P1, P2, P3 are equivalent their respective bounce lengths B1, B2, B3. For example, the first pupil length P1 can be adjusted by adjusting the first microlens 205A, so that the first pupil length P1 is equivalent to the first bounce length B1. The first microlens 205A is operable to emit the first light L1 having the first spectrum so that the first light L1 is emitted at a first cone angle θ1 that results in a first pupil length P1 that is equivalent to the first bounce length B1. The first microlens 205A is sized and shaped to emit the first light L1 having the first spectrum. The second pupil length P2 can be adjusted by adjusting the second microlens 205B, so that the second pupil length P2 is equivalent to the second bounce length B2. The second microlens 205B is operable to emit the second light L2 having the second spectrum so that the second light L2 is emitted at a second cone angle θ2 that results in a second pupil length P2 that is equivalent to the second bounce length B2. The second microlens 205B is sized and shaped to emit the second light L2 having the second spectrum. The third pupil length P3 can be adjusted by adjusting the third microlens 205C, so that it is equivalent to the third bounce length B3. The third microlens 205C is operable to emit the third light L3 having the third spectrum so that the third light L3 is emitted at a third cone angle θ3 that results in a third pupil length P3 that is equivalent to the third bounce length B3. The third microlens 205C is sized and shaped to emit the third light L3 having the third spectrum. The pupil lengths P1, P2, P3 being equivalent to their respective bounce lengths B1, B2, B3 helps increase the efficiency of the augmented reality device 200 and decrease the occurrence of a ghost image.

Figure 3A:
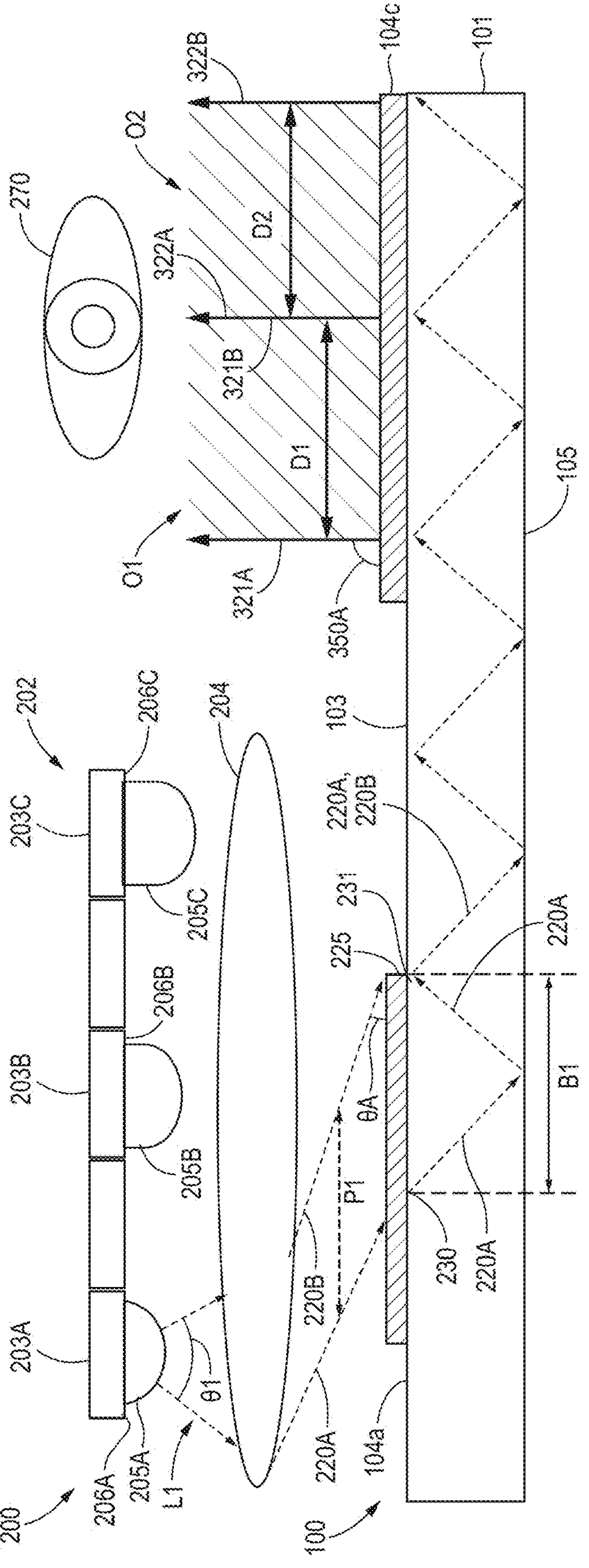
FIGS. 3A-3C are schematic cross-sectional views of an augmented reality device in operation, according to one or more embodiments.
Figure 3B:
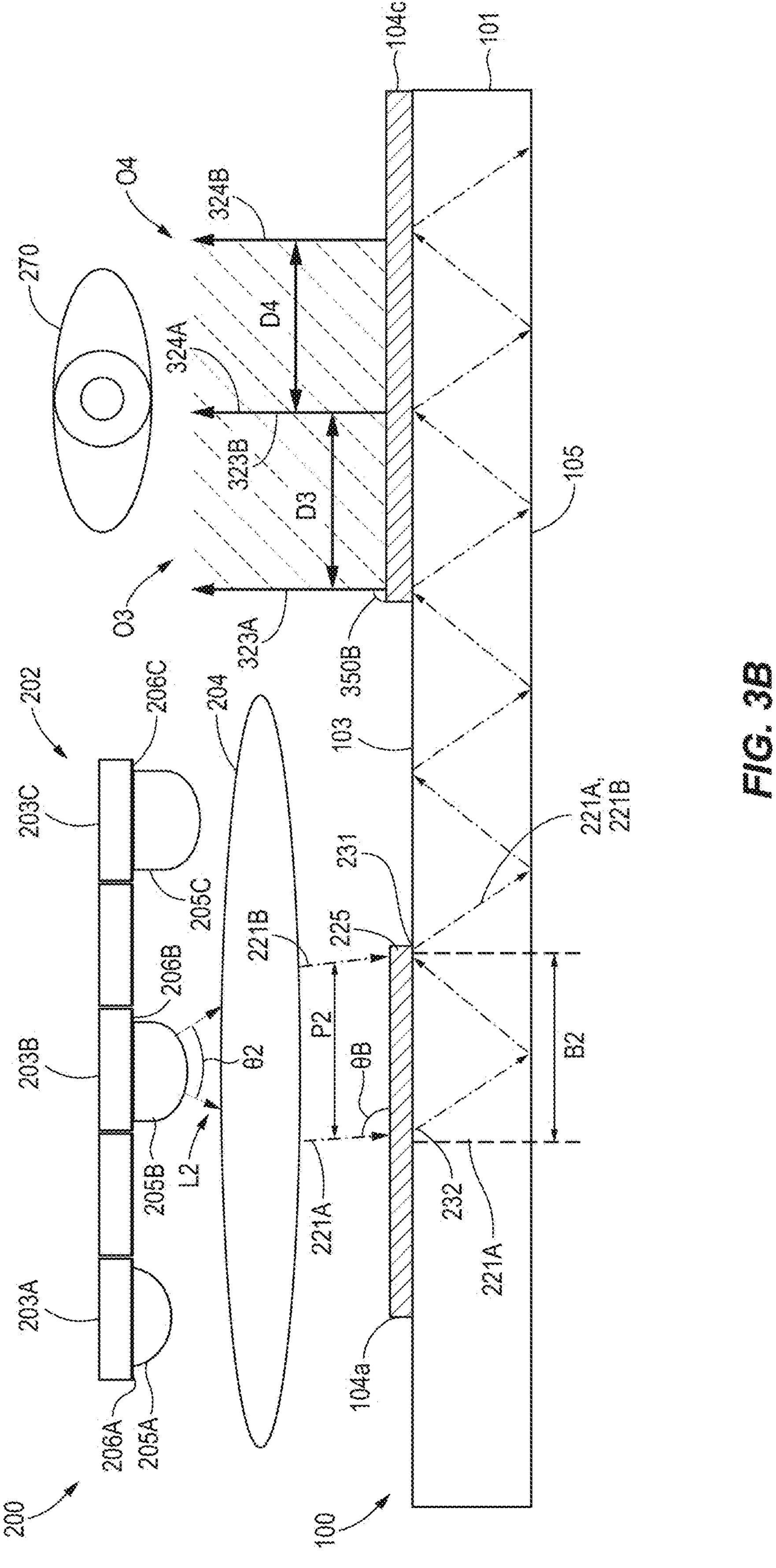
Figure 3C:
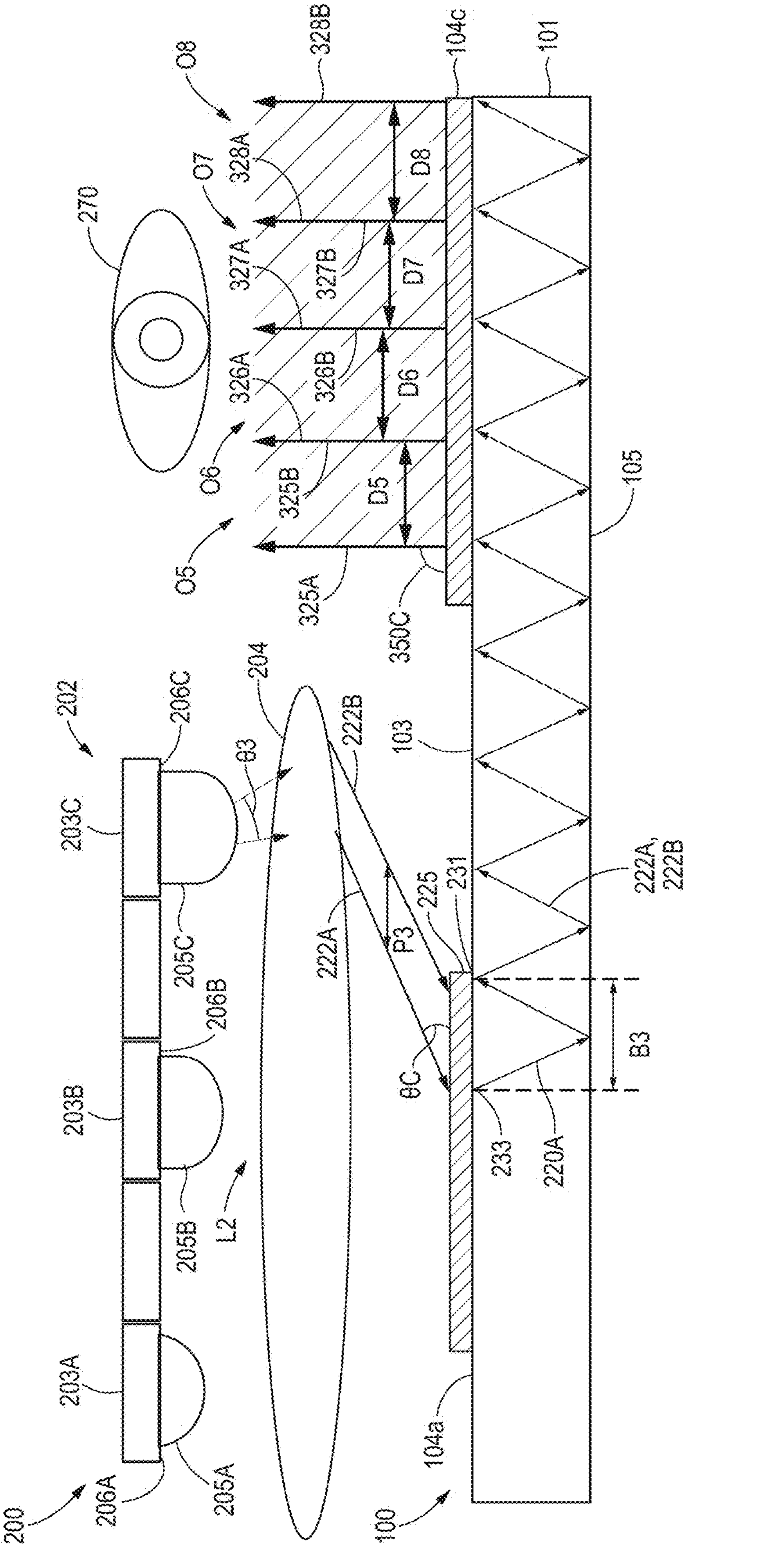

FIGS. 3A-3C are a schematic cross-sectional view of the augmented reality device 200, according to one or more embodiments. FIG. 3A shows the light engine 202 only emitting the first light L1. It should be understood that the light engine 202 only emitting the first light L1 has been done for illustrative purposes and any number of light beams such as the second light L2 and the third light L3 can be emitted simultaneously.

In FIG. 3A, the first light L1 is incoupled into the substrate 101 through the input coupler 104*a* as described in FIG. 2. The second point 231 is aligned with the inner edge 225 of the input coupler 104*a*. The inner edge 225 being aligned with the second point 231 ensures that the first light L1 is not reflected back into the input coupler 104*a*. After the first end 220A has completed one bounce against the second surface 105, the first end 220A and the second end 220B of the first light L1 overlap while within the substrate 101.

After the first light L1 enters the input coupler 104*a*, it is reflected within the substrate 101 until reaches the output coupler 104*c*. Once the first light L1 reaches the output coupler 104*c* one or more output beams O1, O2 are emitted from the output coupler 104*c* towards a user's eye 270. The output beams O1, O2 are outcoupled at a first output angle 350A. A first output beam O1 has a first end 321A and a second end 321B separated by a first distance D1. A second output beam O2 has a first end 322A and a second end 322B separated by a second distance D2. The first distance D1 and the second distance D2 are both equivalent to the first bounce length B1 and the first pupil length P1. The first distance D1 and the second distance D2 being equivalent to the first bounce length B1 causes the second end 221B of the first output beam O1 to overlap with the first end 222A of the second output beam O2. Therefore, there is no distance between the end of the first output beam O1 and the beginning of the second output beam O2. Although FIG. 3A shows the augmented reality device 200 having only two output beams, it should be understood that this has been done for illustrative purposes and that the first light L1 can produce any number of output beams. The output beams O1, O2 are adjacent (i.e., have no distance between them), which increases the efficiency of the augmented reality device 200.

In FIG. 3B, the second light L2 is incoupled into the substrate 101 through the input coupler 104*a* as described in FIG. 2. The second point 231 is aligned with the inner edge 225 of the input coupler 104*a*. The inner edge 225 being aligned with the second point 231 ensures that the second light L2 is not reflected back into the input coupler 104*a*. After the first end 221A has completed one bounce against the second surface 105, the first end 221A and the second end 221B of the second light L2 overlap while within the substrate 101.

After the second light L2 enters the input coupler 104*a*, it is reflected within the substrate 101 until reaches the output coupler 104*c*. Once the second light L2 reaches the output coupler 104*c* one or more output beams O3, O4 are emitted from the output coupler 104*c* towards a user's eye 270. The output beams O3, O4 are outcoupled at a second output angle 350B. A third output beam O3 has a first end 323A and a second end 323B separated by a third distance D3. A fourth output beam O4 has a first end 324A and a second end 324B separated by a fourth distance D4. The third distance D3 and the fourth distance D4 are both equivalent to the second bounce length B2 and the second pupil length P2. The third distance D3 and the fourth distance D4 being equivalent to the second bounce length B2 causes the second end 323B of the third output beam O3 to overlap with the first end 324A of the fourth output beam O4. Therefore, there is no distance between the end of the third output beam O3 and the beginning of the fourth output beam O4. Although FIG. 3B shows the augmented reality device 200 having only 2 output beams, it should be understood that this has been done for illustrative purposes and that the second light L2 can produce any number of output beams. The output beams O3, O4 are adjacent (i.e., have no distance between them), which increases the efficiency of the augmented reality device 200.

In FIG. 3C, the third light L3 is incoupled into the substrate 101 through the input coupler 104*a* as described in FIG. 2. The second point 231 is aligned with the inner edge 225 of the input coupler 104*a*. The inner edge 225 being aligned with the second point 231 ensures that the third light L3 is not reflected back into the input coupler 104*a*. After the first end 222A has completed one bounce against the second surface 105, the first end 222A and the second end 222B of the third light L3 overlap while within the substrate 101.

After the third light L3 enters the input coupler 104*a*, it is reflected within the substrate 101 until reaches the output coupler 104*c*. Once the third light L3 reaches the output coupler 104*c* one or more output beams O5, O6, O7, O8 are emitted from the output coupler 104*c* towards a user's eye 270. The output beams O5, O6, O7, O8 are outcoupled at a third output angle 350C. A fifth output beam O5 has a first end 325A and a second end 325B separated by a fifth distance D5. A sixth output beam O6 has a first end 326A and a second end 326B separated by a sixth distance D6. A seventh output beam O7 has a first end 327A and a second end 327B separated by a seventh distance D7. An eighth output beam O8 has a first end 328A and a second end 328B separated by an eighth distance D8. The fifth distance D5, the sixth distance D6, the seventh distance D7, and the eighth distance D8 are all equivalent to the third bounce length B3 and the third pupil length P3. The distances D5, D6, D7, D8 being equivalent to the third bounce length B3 causes the second end 325B of the fifth output beam O5 to overlap with the first end 326A of the sixth output beam O6, the second end 326B of the sixth output beam O6 to overlap with the first end 327A of the seventh output beam O7, and the second end 327B of the seventh output beam O7 to overlap with the first end 328A of the eighth output beam O8. Therefore, there is no distance between the each of the output beam O5, O6, O7, O8. Although FIG. 3C shows the augmented reality device 200 having four output beams, it should be understood that this has been done for illustrative purposes and that the third light L3 can produce any number of output beams. The output beams O5, O6, O7, O8 are all adjacent to each other (i.e., have no gaps between them), which increases the efficiency of the augmented reality device 200.

Figure 4:
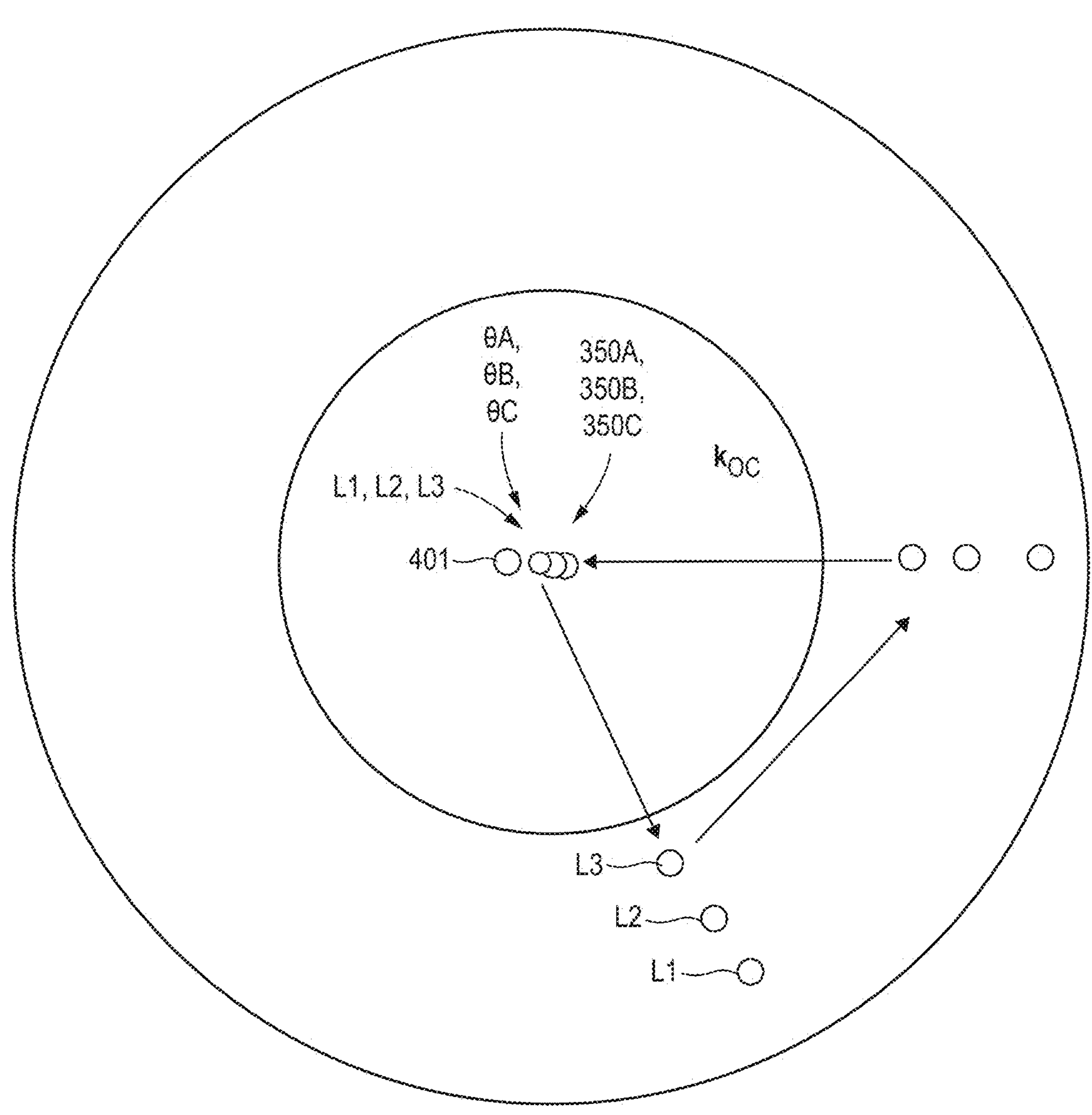
FIG. 4 is a k-space diagram of a waveguide of an augmented reality device, according to one or more embodiments.

FIG. 4 is a k-space diagram of the augmented reality device 200, according to one or more embodiments. The augmented reality device 200 includes the waveguide 100. The waveguide 100 includes the input coupler 104*a*, the pupil expander 104*b*, and the output coupler 104*c* disposed on the substrate 101.

The first light L1, the second light L2, and the third light L3 enter the input coupler 104*a* at a corresponding first input angle θA, second input angle θB, and third input angle θC (the input angles θA, θB, θC), the first light L1, the second light L2, and the third light L3 undergo total internal reflection (TIR) within the waveguide 100. As illustrated by a k-space diagram, the light engine 202 projects an image having first light L1, the second light L2, and the third light L3 (hereinafter the "light beams L1, L2, L3"). The first light L1 is diffracted by the first microlens 205A such that it is emitted at the first cone angle θ1. The second light L2 is diffracted by the second microlens 205B such that it is emitted at the second cone angle θ2. The third light L3 is diffracted by the third microlens 205C such that it is emitted at the third cone angle θ3. The light beams L1, L2, L3 are diffracted by the projector lens 204 such that the light beams L1, L2, L3 have input angles θA, θB, θC that are different from each other at the input coupler 104*a*. I.e., the light beams L1, L2, L3 have corresponding input angles θA, θB, θC that spread the light beams L1, L2, L3 across the input coupler 104*a*. Additionally, the first light L1 is diffracted by the projector lens 204 such that the first light L1 has the first pupil length P1. The second light L2 is diffracted by the projector lens 204 such that the second light L2 has the green pupil length P2. The third light L3 is diffracted by the projector lens 204 such that the third light L3 has the third pupil length P3.

The first light L1, the second light L2, and the third light L3 leave the output coupler 104*c* at a corresponding first output angle 350A, second output angle 350B, and third output angle 350C. The first output angle 350A, second output angle 350B, and third output angle 350C (the output angles 350A, 350B, 350C) are about the same. In one or more embodiments, the first light L1 produces a plurality of red output beams. The second light L2 produces a plurality of green output beams. The third light L3 produces a plurality of blue output beams. The red output beams, the green output beams, and the blue output beams each have no distance between each outer as shown and described in FIGS. 3A-3C. The microlenses 205A, 205B, 205C compensate for the waveguide 100 and the projector lens 204 by adjusting the cone angles θ1, θ2, θ3 of the respective light beams L1, L2, L3 such that the k-space diagram in FIG. 3B has a non-zero k-vector. Using the microlenses 205A, 205B, 205C to compensate for the waveguide 100 and the projector lens 204 enhances the ultimate image quality and reduces costs associated with more complex waveguides and projector lenses. The output beams of the first light L1, the second light L2, and the third light L3 combined result in a desired image 401 being outcoupled by the waveguide 100.

Benefits of the present disclosure include an augmented reality device 200 having increased efficiency, increased image resolution, and decreased occurrence of a ghost image.

It is contemplated that one or more aspects disclosed herein may be combined. As an example, one or more aspects, features, components, operations and/or properties of the waveguide 100, the augmented reality device 200, the light engine 202, the first light L1, the second light L2, the third light L3, the projection lens 204, the first microlens 205A, the second microlens 205B, and/or the third microlens 205C may be combined. Moreover, it is contemplated that one or more aspects disclosed herein may include some or all of the aforementioned benefits.

While the foregoing is directed to embodiments of the present disclosure, other and further embodiments of the disclosure may be devised without departing from the basic scope thereof, and the scope thereof is determined by the claims that follow.

What is claimed is:

1. An augmented reality device, comprising:
a projection system comprising:
a light engine comprising a pixel, wherein the pixel comprises an emission surface;
a microlens coupled to the emission surface of the pixel; and
a projection lens configured to refract a first light emitted by the pixel, wherein the first light has a first pupil length defined by a distance between a first end and a second end of the first light; and
a waveguide comprising:
an input coupler configured to incouple the first light at a first bounce length that is equivalent to the first pupil length.

2. The device of claim 1, wherein the waveguide further comprises:
a substrate comprising a first surface and a second surface opposing the first surface, wherein the input coupler is disposed over the first surface or the second surface; and
an output coupler disposed over the substrate, the output coupler configured to emit a plurality of output beams, the plurality of output beams at least comprising a first output beam and a second output beam, the first output beam having a first distance and the second output beam having a second distance, wherein the first distance and the second distance are equivalent to the first bounce length.

3. The device of claim 1, wherein the microlens refracts the first light at a first cone angle.

4. The device of claim 1, wherein the projection lens refracts the first light at a first input angle.

5. The device of claim 1, wherein the first end of the first light is incoupled into the waveguide at a first point and the second end of the first light is incoupled into the waveguide at a second point.

6. The device of claim 5, wherein the first end the first light contacts the second point after completing one bounce.

7. The device of claim 1, wherein the first end of the first light aligns with the second end of the first light while inside the waveguide.

8. An augmented reality device, comprising:
a projection system comprising:
a light engine comprising a plurality of pixels, the plurality of pixels comprising:
a first pixel configured to emit a first light at a first spectrum; and
a second pixel configured to emit a second light at a second spectrum;
a plurality of microlenses comprising:
a first microlens coupled to a first emission surface of the first pixel; and
a second microlens coupled to a second emission surface of the second pixel;
a projection lens configured to refract the first light and the second light, wherein the first light has a first pupil length and the second light has a second pupil length; and
a waveguide comprising:
an input coupler configured to incouple the first light and the second light, wherein the first light is incoupled at a first bounce length equivalent to the first pupil length and the second light is incoupled at a second bounce length equivalent to the second pupil length.

9. The device of claim 8, wherein the waveguide further comprises:
a substrate comprising a first surface and a second surface opposing the first surface, wherein the input coupler is disposed over the first surface or the second surface; and
an output coupler formed on the substrate, the output coupler configured to emit a plurality of output beams, the plurality of output beams at least comprising a first output beam and a second output beam, the first output beam comprising a first end and a second end, the second output beam comprising a third end and a fourth end, wherein the second end of the first output beam and the third end of the second output beam are aligned.

10. The device of claim 8, wherein the first microlens refracts the first light at a first cone angle and the second microlens refracts the second light at a second cone angle.

11. The device of claim 8, wherein the projection lens refracts the first light at a first input angle and the second light at a second input angle.

12. The device of claim 8, wherein a first end of the first light is incoupled into the waveguide at a first point and a second end of the first light is incoupled into the waveguide at a second point, a third end of the second light is incoupled into the waveguide at a third point and a fourth end of the second light is incoupled into the waveguide at the second point.

13. The device of claim 12, wherein an end of the first end of the first light and the third end of the second light contact the second point after completing one bounce.

14. The device of claim 12, wherein the first end of the first light aligns with the second end of the first light while inside the waveguide and the third end of the second light aligns with the fourth end of the second light while inside the waveguide.

15. The device of claim 12, wherein the second point is aligned with an inner edge of the incoupler.

16. The device of claim 8, wherein the first spectrum and the second spectrum are different from one another.

17. The device of claim 8, wherein the first pupil length and the second pupil length are different from one another.

18. The device of claim 8, wherein the first bounce length and the second bounce length are different from one another.

19. The device of claim 9, wherein each output beam of the plurality of output beams are outcoupled at a first outcouple angle.

20. A method of projecting a light comprising:
emitting a light from a pixel into a microlens;
refracting the light from the microlens into a projection lens, wherein the light has a first cone angle;
refracting the light from the projection lens into an input coupler of a waveguide, wherein the light has a pupil length, the pupil length is defined by a distance between a first end of the light and a second end of the light, wherein the second end of the light is emitted at an inner edge of the input coupler; and
reflecting the light within the waveguide towards an output coupler of the waveguide, wherein the light has a bounce length, wherein the bounce length and the pupil length are equivalent.

* * * * *